Figure 1:
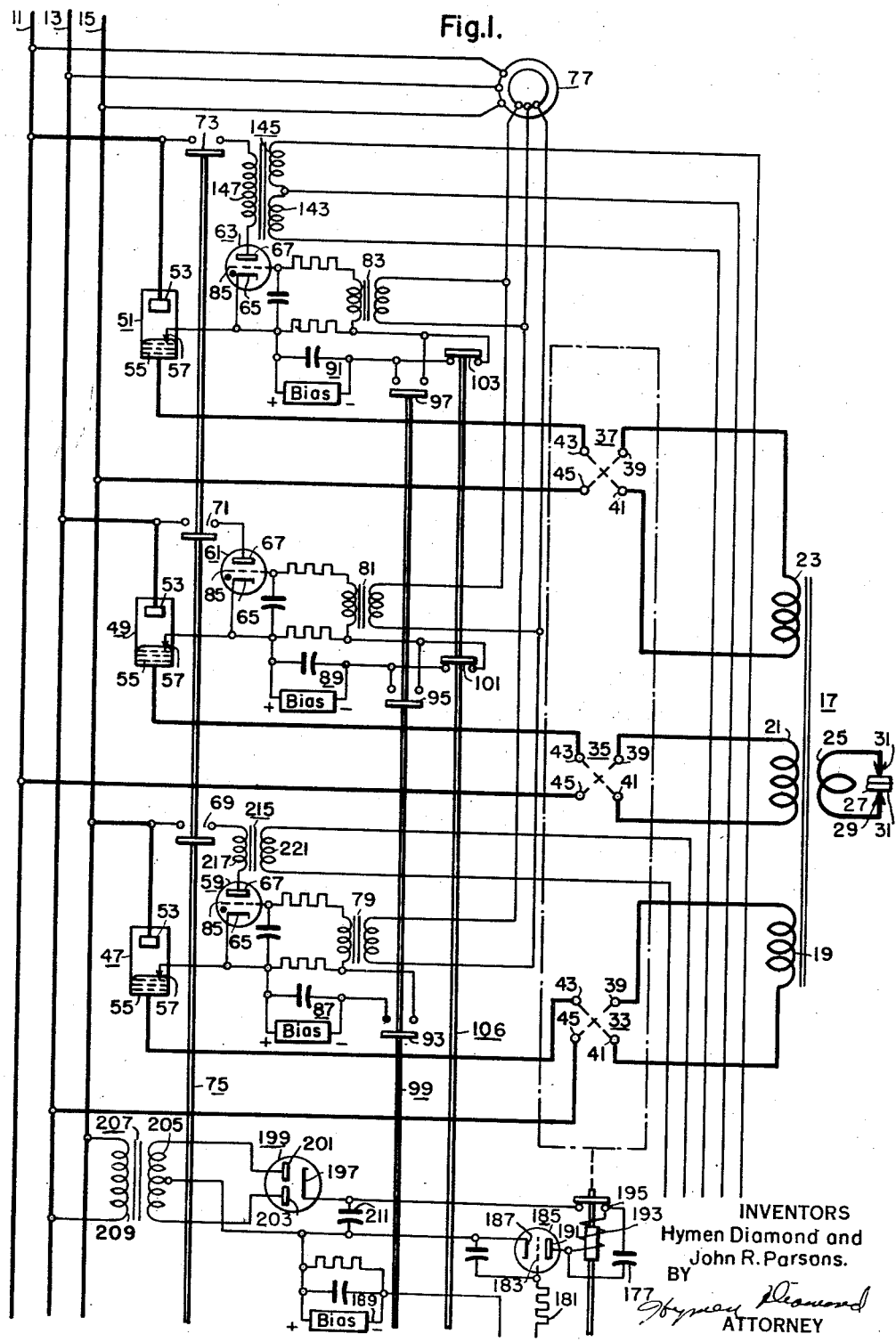

Sept. 14, 1954    H. DIAMOND ET AL    2,689,323
ELECTRONIC WELDING SYSTEM
Filed May 2, 1950    3 Sheets-Sheet 1

INVENTORS
Hymen Diamond and
John R. Parsons.
BY
ATTORNEY

Sept. 14, 1954   H. DIAMOND ET AL   2,689,323
ELECTRONIC WELDING SYSTEM
Filed May 2, 1950   3 Sheets-Sheet 3

WITNESSES:

INVENTORS
Hymen Diamond and
John R. Parsons.
BY
ATTORNEY

Patented Sept. 14, 1954

2,689,323

UNITED STATES PATENT OFFICE 2,689,323

ELECTRONIC WELDING SYSTEM

Hymen Diamond, Pittsburgh, Pa., and John R. Parsons, Kenmore, N. Y., assignors to Westinghouse Electric Corporation, East Pittsburgh, Pa., a corporation of Pennsylvania Application May 2, 1950, Serial No. 159,496

9 Claims. (Cl. 321—3)

Our invention relates to electrical apparatus and more particularly to electronic welding systems.

Modern welding systems often utilize electric discharge devices to act as valves to control the flow of power from a source of supply to the welding load. Because they are capable of carrying currents of large magnitude, electric discharge devices of the ignitron type are often employed. A welding load presents a difficult problem of power supply. This is due to its characteristics of low power factor and intermittent heavy current demand.

A three-phase to single-phase low frequency welding system appears to present the best solution to these problems. In such systems the welding electrodes are connected across the secondary of a three-phase to single-phase transformer. Power is supplied from a commercial three-phase source. A pair of ignitrons are connected inversely in parallel in series with a transformer primary winding across each phase of the power supply. An electric discharge device, usually a thyratron, is connected between the anode and ignitor of each ignitron. Control circuits are associated with these thyratrons to cause conduction of selected ignitrons during predetermined intervals. For purposes of explanation, the ignitrons may be divided into two groups, each group comprising ignitrons of like polarity. To make a single weld, several cycles of low frequency current may be passed through the welding load. To form a positive half period of one of these cycles the ignitrons of one group are rendered conductive during intervals of the commercial supply when their anode potentials are positive. During these intervals, the ignitrons of the other group are held non-conductive. To form a negative half period of welding current the ignitrons of the other group are rendered conductive during intervals of the supply when their anodes are positive while the ignitrons of the first group are held non-conductive. The frequency of the welding current is determined by the number of times the ignitrons of a group are rendered conductive to form a half period of welding current.

Such systems are on the whole satisfactory from the standpoint of performance. However, the positive half periods of the welding current are formed by one group of ignitrons with their firing thyratrons and associated control circuits while the negative half periods of welding current are formed by a duplicate group of ignitrons, thyratrons and associated control circuits. Generally speaking, one group of apparatus is idle while the other group is working. This idle period amounts to about 50% of the total time during which the welding apparatus is in operation.

It is accordingly an object of our invention to provide a welding system which makes efficient use of its component parts.

It is another object of our invention to provide a welding system which utilizes a minimum of component parts.

It is another object of our invention to provide a welding system which will satisfactorily perform the same functions as prior art apparatus and yet have fewer component parts.

It is a further object of our invention to provide a welding system which is less costly than those of the prior art which perform the same functions.

It is an ancillary object of our invention to provide a welding system which is simple in its design.

It is another ancillary object of our invention to provide a welding system which is more compact than systems of the prior art which perform the same functions.

Our invention, when two groups of ignitrons are used as described in the foregoing, arises from the realization that one group of ignitrons, their firing thyratrons and associated control circuits are active only about 50% of the time during which the welding apparatus is in operation. In accordance with our invention, we provide one ignitron for connection in series with the load terminals of each phase of the load across a corresponding phase of the supply. A reversing switch is connected across the load terminals of each phase of the load and the corresponding phase of the supply. Control means is provided for producing successive cycles of ignitron conduction and non-conduction and for actuating the reversing switches during the non-conductive portion of the cycles.

Figure 1A:
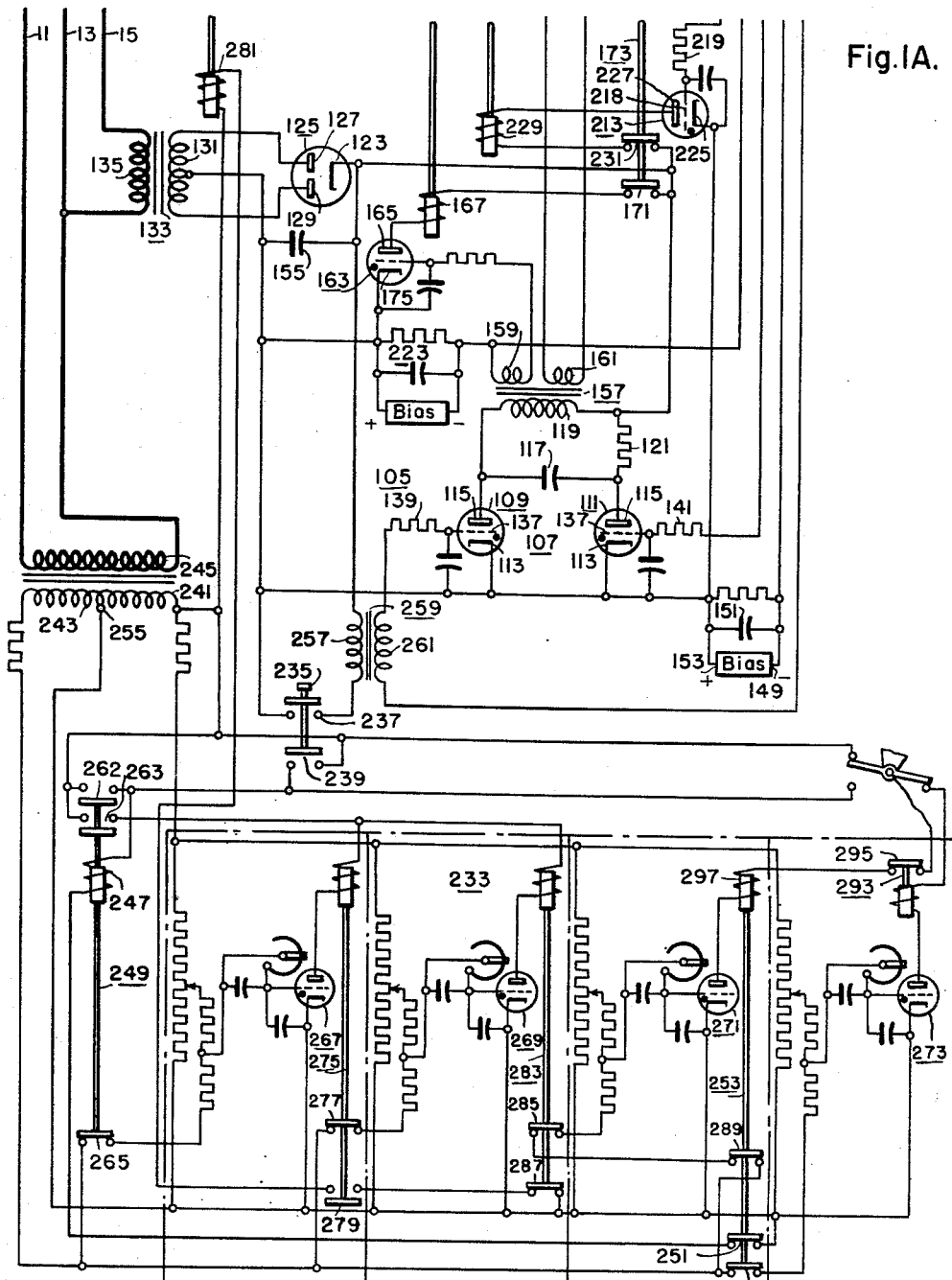
Figure 2:
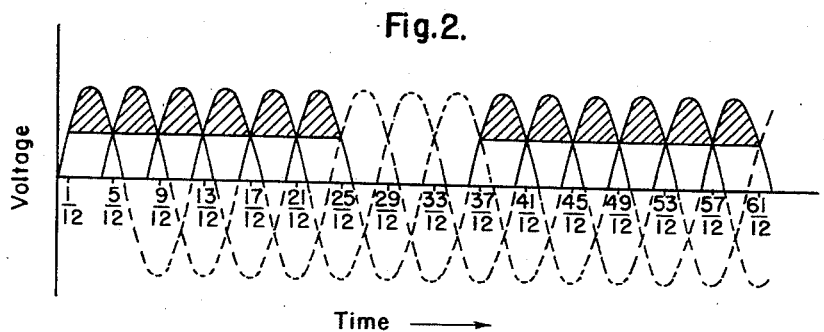
Figure 3:
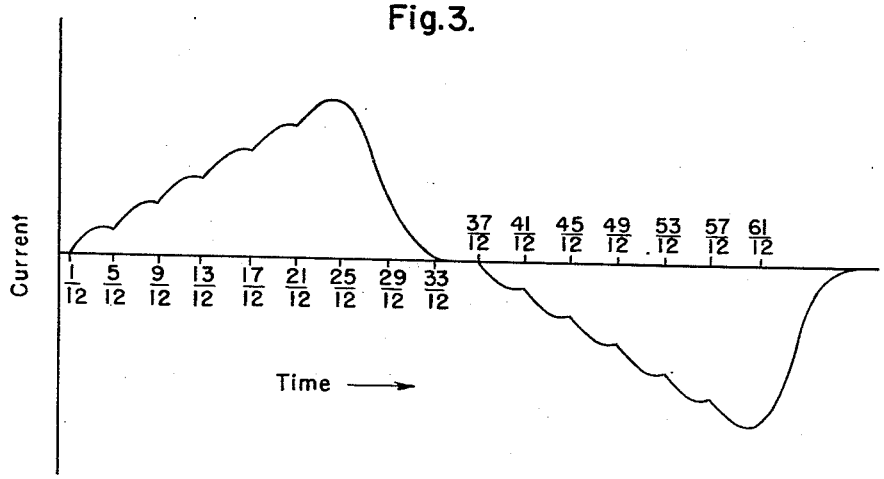

The novel features which we consider to be characteristic of our invention are set forth with particularity in the appended claims. The invention itself, however, both as to its organization and its mode of operation, together with additional objects, advantages and novel features thereof, will be best understood from the following description of a specific embodiment thereof, especially when read in connection with the accompanying drawings, wherein:

Figs. 1 and 1a are schematic diagrams showing a preferred embodiment of our invention; and Figs. 2 and 3 are graphs showing the relation between the supply potential and welding current in the operation of our system.

With reference to Figs. 1 and 1a which show our invention as applied to a three-phase to single-phase low frequency welding system; first, second and third buses 11, 13, 15 are provided for connection to a commercial three-phase delta connected power supply. A welding transformer indicated generally at 17 is provided having first, second and third primary windings 19, 21, 23 and a single secondary winding 25. A welding load 27 is conventionally shown between welding electrodes 29, 31 which are connected across the welding transformer secondary winding 25. First, second and third reversing switches 33, 35, 37 have two of their poles 39, 41 connected across respective transformer secondary windings 19, 21, 23. The other two poles 43, 45 of these reversing switches 33, 35, 37 are connected in series with first, second and third ignitrons 47, 49, 51 respectively across corresponding power supply buses 11, 13, 15. Each ignitron has an anode 53, a cathode 55 and an ignitor electrode 57. First, second and third firing thyratrons 59, 61, 63 are associated with corresponding ignitrons 47, 49, 51. The firing thyratrons have their cathodes 65 connected to the ignitor electrodes 57 and their anodes 67 connected through the normally open contacts 69, 71, 73 of a relay 75 to the anodes 53 of the respective ignitrons 47, 49, 51. Firing potential is supplied in a conventional manner through a phase shifter 77 and transformer 79, 81, 83 to the grids 85 of the firing thyratrons 59, 61, 63. A source of negative bias indicated generally at 87, 89, 91 is provided in the grid circuit of each firing thyratrons 59, 61, 63. This bias is of sufficient magnitude to overcome the firing potential which is supplied from the phase shifter 77. Normally open contacts 93, 95, 97 of a relay 99 are connected in series with the bias supplies 87, 89, 91. Normally closed contacts 101, 103 of a relay 106 are provided in series with the bias supplies 89, 91 of the second and third firing thyratrons 61, 63.

A control circuit, indicated generally at 105, is provided for controlling conduction of the ignitrons 47, 49, 51 during the welding interval and to control the operation of the reversing switches 33, 35, 37. This control circuit includes a gating network 107 which employs a pair of thyratrons 109, 111 whose cathodes 113 are connected together and whose anodes 115 are coupled by a capacitor 117. A transformer primary winding 119 is connected in series with a resistance 121 across the coupling capacitor 117. The junction of this transformer winding 119 and resistor 121 is connected to the cathode 123 of a full-wave rectifier tube 125 whose anodes 127, 129 are connected to the outer terminals of the center tapped secondary winding 131 of a supply transformer 133. The center tapped terminal of this transformer 133 is connected to the cathodes 113 of the gating thyratrons 109, 111. The primary 135 of the supply transformer 133 is connected across one phase of the commercial power supply.

The control elements 137 of the gating thyratrons are connected through grid resistors 139, 141 to the outer terminals of the center tapped secondary winding 143 of a transformer 145 whose primary winding 147 is connected in the anode circuit of the third firing thyratron 63. The two halves of this transformer secondary 143 are wound oppositely so that when a D. C. pulse is applied to the primary, the outer terminals will be positive with respect to the center tap terminal. The center tap 4 of the transformer secondary 143 is connected to the negative terminal 149 of a common grid bias supply 151 whose positive terminal 153 is connected to the cathodes 113 of the gating thyratrons 109, 111. A filtering capacitor 155 is connected between the cathode 123 and the center tap of transformer 133.

The transformer 157 whose primary winding 119 is connected in the anode circuits of the gating thyratron 109 has two secondary windings 159, 161. One of these secondary windings is connected in the grid circuit of a thyratron 163. The anode 165 of this thyratron 163 is connected through the operating coil 167 of a relay 99 and normally closed contacts 171 of a relay 173 to the cathode 123 of the full-wave rectifier 125. The cathode 175 of this thyratron 163 is connected to the center tap of the full-wave rectifier supply transformer 133. The other secondary winding 161 of the gating network transformer 157 is connected in a series circuit which may be traced from one terminal of the winding 161, through grid resistance 181, the grid 183 of a thyratron 185, its cathode 187 and a negative grid bias supply 189 to the other terminal of the winding 161. The anode 191 of this thyratron is connected through the operating coil 193 of a relay 173, normally closed contacts 195 of the relay 173 to the cathode 197 of a full-wave rectifier tube 199. A capacitor is connected across this operating coil 193 to interpose a slight delay in the operation of the relay 173.

The anodes of the full-wave rectifier tube 199 are connected to the outer terminals of the center tapped secondary winding 205 of a transformer 207. The center tap terminal is connected to the cathode 187 of the thyratron 185. The primary winding 209 of the full-wave rectifier supply transformer 207 is connected to the buses 13, 15 of one phase of the commercial power supply. A capacitor 211 is connected between the cathode 197 of the full-wave rectifier tube 199 and the center tap terminal of its supply transformer secondary winding 205. Another thyratron 213 is provided for operating the relay 106 which, when energized, opens the bias supply circuits 89, 91 of the second and third firing thyratrons 61, 63.

Firing potential is supplied to the grid circuit of this thyratron 213 from a transformer 215 whose primary 217 is connected in the anode circuit of the first firing thyratron 59. A circuit may be traced from the grid 218 of the thyratron 213 through a resistance 219, the secondary 221 of the transformer 215 and a negative grid bias supply 223 to the cathode 225 of the thyratron 213. The anode 227 of this thyratron 213 is connected through the operating coil 229 of the relay 106, a normally closed contact 231 of the relay 106 to the junction of the gating network transformer primary winding 119 and a resistance 121.

A sequence timer 233 shown within the block is provided for controlling the conventional Squeeze, Weld, Hold and Off functions of the welding system. The details of this sequence timer are not a part of our invention and it will therefore be described insofar as is necessary to give an understanding of the operation of our system. A sequence timer of this type is disclosed and described in Patent 2,533,318 of Edward C. Hartwig, which is assigned to the Westinghouse Electric Corporation.

A push button 235 having two pairs of contacts 237, 239 is provided for initiating the operation of our system. One pair of these contacts 239 is connected from an outer terminal 241 of a center tapped secondary winding 243 of a supply transformer 245 through the operating coil 247 of a start relay 249 and normally closed contacts 251 of the hold relay 253 to the center tap terminal 255 of the supply transformer 245. When this push button 235 is actuated it momentarily closes its second pair of contacts 237. These contacts 237 are connected in series with the primary winding 257 of a transformer 259 and the full-wave rectifier 125. The secondary 261 of this transformer 259 is connected in the grid circuit of the first gating thyratron 109.

The start relay 249 has three sets of contacts 262, 263, 265. One set 262 is connected in shunt with the push button start contacts 239, one set 263 is connected in the anode supply circuits of the sequence timer thyratrons 267, 269, 271, 273 and one set 265 is connected in the grid circuit of the squeeze thyratron 267. The squeeze relay 275 has one set of normally closed contacts 277 in the grid circuit of the weld thyratron 269 and one set of normally open contacts 279 in series with the operating coil 281 of a relay 75 which controls the anode circuits of the firing thyratrons 59, 61, 63. The weld relay 283 has one set of normally closed contacts 285 in the grid circuit of the hold thyratron 271 and one set of normally closed contacts 287, in series with the normally open contacts 279 of the squeeze relay 275. The hold relay 253 has three sets of normally closed contacts 251, 289 and 291. One set 289 is in the grid circuit of the hold thyratron 271, one set 291 is in the grid circuit of the off thyratron 273 and one set 251 is in series with the operating coil 247 of the start relay 249. The off relay 293 has one normally closed set of contacts 295 in series with the operating coil 297 of the hold relay 253.

To initiate operation of the welding apparatus shown in Figs. 1 and 1a, the push button 235 is depressed. A positive pulse is thereby furnished to the grid of the first gating thyratron 109 rendering it conductive. The start relay 249 is actuated and its contacts 262 shunt contacts 239 of the push button 235. Contacts 263 close the anode circuits of the sequence timer thyratrons, and contacts 265 open the grid bias charging circuit of the squeeze thyatron 267 to start the squeeze timing. Contacts (not shown) on the start relay 249 operate to actuate a mechanism (not shown) for clamping the electrodes 29, 31 on the material 27 to be welded.

At the end of the squeeze time the squeeze relay 275 operates. Contacts 277 open to start the weld time and contacts 279 close to operate the relay 75 for closing the anode circuits of the firing thyratrons 59, 61, 63. At this time, the second and third firing thyratrons 61, 63 are held non-conductive since their grid bias circuits 89, 91 are closed by the contacts 101, 103 of a relay 106. The first firing thyratron 59, however, conducts when the potential of its phase of the commercial supply becomes sufficiently positive, and the first ignitron 47 is fired. Conduction of the first firing thyratron 59 sends a positive pulse through the transformer 215 in its anode circuit to the grid 218 of a thyratron 213 which conducts to energize the relay 106 whose contacts 101, 103 open to remove the grid bias from the second and third firing thyratrons 61, 63. This operation occurs within a sufficiently brief time interval that the second and third firing thyratrons 61, 63 are rendered conductive during the first positive half periods of their phases of the commercial supply immediately successive to the positive half period of the supply during which the first firing thyratron 59 was rendered conductive. Thus, the ignitrons are fired in the order, first, second, third during successive positive half periods of the commercial power supply. Conduction of the third firing thyratrons 63 causes a positive pulse to be transmitted through the transformer 145 in its anode circuit to the grids 137 of the gating thyratrons 109, 111. The positive pulse on the grid of the second gating thyratron 111 causes it to conduct and it acts together with the coupling capacitor 117 to momentarily shunt the first gating thyratron 109 which then ceases conduction. Cessation of conduction by the first gating thyratron 109 causes a change of flux in the gating circuit transformer 157 which sends negative pulses to the grids of thyratrons 163, 185. These thyratrons remain non-conductive, so the firing tube bias cut off relay 99 is not operated. Consequently, the ignitrons 47, 49, 51 fire again in the order first, second, third during the intervals when the anode potentials of their respective power supply phases are positive.

Refer now to the graphs of Figs. 2 and 3. The curves of Fig. 2 represent the wave form of the potentials of the three-phase commercial power supply. Voltage is plotted as the ordinate and time as the abscissa. A time of 12/12 along the abscissa is equal to 360° or a full cycle of one phase of the commercial supply. The shaded areas represent the intervals during which the various phases of the power supply are contributing power to their respective ignitrons. The curves of Fig. 3 represent the current in the welding transformer secondary winding or the welding current. Current is plotted as ordinate and time as abscissa. The time scale is the same as for Fig. 2.

In the operation of our system as thus far described the ignitrons have fired in the sequence first, second, third; first, second, third. At the time 21/12 when the third firing thyratron 63 becomes conductive for the second time, positive pulses are again transmitted by the transformer 145 to the grids 137 of the gating thyratrons 109, 111. The gating coupling capacitor 117 has meanwhile reached a steady state condition so that the anode 115 of the first gating thyratron 109 is sufficiently positive for conduction. This thyratron 109 conducts and together with the coupling capacitor 117 shunts the second gating thyratron 111 so that it ceases conduction. Starting conduction of the first gating thyratron 109 causes a change of flux in the gating circuit transformer 157 which is such as to produce positive pulses on the grids of the thyratrons 163, 185. The thyratron 163 is rendered conductive, energizing the relay 99 to close the grid bias circuits 87, 89, 91 of the firing thyratrons 59, 61, 63. No ignitron is fired at the time 25/12 and so the welding current decays to zero. Thus, the positive half period of the first cycle of low frequency welding current is completed. The thyratron 185 is also rendered conductive by a positive pulse from the gating circuit transformer 157 to energize the relay 173 which actuates the reversing switches 33, 35, 37. This operation of the relay 173 is sufficiently delayed by the action of the capacitor 177 connected across its operating coil 193 that the reversing switches 33, 35, 37 are actuated after the welding current has decayed to zero.

The capacitor 211 has been charged through the full-wave rectifier 199 prior to conduction of the thyratron 185. When the thyratron 185 conducts, it shunts this capacitor 211 causing a pulse of current through the operating coil 193 of the relay 173. Contacts 195 open the circuit of the operating coil 193 so that the relay 173 immediately drops out. The reversing switch operating mechanism may be of any suitable type which will actuate the reversing switches when the relay 173 is energized and reset when the relay 173 drops out. Operation of the relay 173 momentarily opens contacts 231, 171, 195 to cause cessation of conduction in the thyratrons 213, 163 and reset the relays 106, 99. The ignitrons 47, 49, 51 now fire another succession first, second, third; first, second, third and are then again cut off. Since the terminals of the welding transformer primaries 19, 21, 23 have been reversed, the welding current for this succession of firing of the ignitrons is opposite in polarity to that produced by the first succession of ignitron firing. Thus, the negative half period of the first cycle of welding current is formed. Successive positive and negative half periods of welding current continue until the weld time has expired. Upon expiration of the weld time the weld relay 283 is actuated, opening contacts to deenergize the relay 75 and open the anode circuits of the firing thyratrons 59, 61, 63. Contacts 285 of the weld relay 283 open to start the hold time. At the end of the off time, the off relay 253 is actuated opening contacts 251 which deenergize the start relay 249. If the sequence timer 233 is set for "non-repeat," it is then necessary to actuate the push button 235 in order to produce another welding cycle. If the sequence timer is set for "repeat," another welding cycle is initiated automatically at the end of the off time and successive welding cycles will continue as long as the push button 235 remains depressed. For further details of the operation of the sequence timer, reference is made to the copending application of Edward C. Hartwig, hereinbefore mentioned.

It is to be understood that the present invention is not limited to the particular details described above, since many equivalents for the specific elements and arrangements utilized in the above disclosure will suggest themselves to those skilled in the art. While the invention has been disclosed as applied to a welding system, it is susceptible broadly to use as a system of controlled transmission of power between a multi-phase power system and a single phase load. Additionally, the system may be considered broadly as a frequency changing system for translating the frequency of a source into a lower frequency, having a value which may be selected at will. Various types of tubes may be substituted for the electronic discharge devices disclosed, and modification of the specific circuit arrangement disclosed may be devised, which, however, incorporate the principles of operation set forth in the specific embodiment of the invention herein disclosed.

In view of the above facts, it is desired that the appended claims be accorded a broad interpretation which is commensurate with the true spirit and scope of the invention within the pertinent art.

We claim as our invention:

1. In combination, terminals for connection to three-phase commercial power supply, a transformer having three primary windings, a plurality of ignitrons, each of said primary windings being connected across a pair of said terminals for connection to a phase of said power supply in series with an ignitron, a mechanical reversing switch having forward and reverse positions interposed between each said primary winding and its respective supply terminals, means for rendering said ignitrons conductive in succession for a first time interval and at the end of said interval permitting said ignitrons to become non-conductive while said switch is in said forward position, means for thereafter maintaining said ignitrons conductive during a second time interval, means for actuating said reversing switches during said second interval, and means for thereafter rendering said ignitrons conductive during a third time interval with said switch in said reverse position.

2. Apparatus for controlling the supply of power to a welding transformer having three primary windings and a single secondary winding, from the utility buses of a three-phase commercial power source, comprising in combination, a plurality of ignitrons, conductors connecting each said primary winding in series with an ignitron across the buses of a respective phase of said power source, a reversing switch interposed between each said secondary winding and corresponding ones of said buses for reversing the polarity of said winding, means for firing said ignitrons during successive positive half periods of their respective phases of said power supply for predetermined first time intervals and permitting said ignitrons to become non-conductive at the ends of said intervals, means for maintaining said ignitron non-conductive during second predetermined time intervals, and means for actuating said reversing switches during said second intervals so that the actuation is complete at a time immediately preceding the initiation of said first intervals.

3. Apparatus for supplying power from the buses of a three-bus polyphase commercial supply operating at commercial frequency to an alternating current load operating at a substantially lower frequency comprising in combination, at least one electric discharge device adapted to be directly connected to each of said buses; reverse switching means having forward and reverse positions; means for connecting each of said devices in series with said reverse switching means and said load to another of said buses; means for rendering said devices conductive in a predetermined succession during a first predetermined time interval with said reverse switching means in said forward position; means for causing said devices to become non-conductive at the end of said first time interval with said reverse switching means still in said forward position; means for maintaining said devices non-conductive during a second predetermined time interval; means for actuating said reverse switching means to said reverse position during said second interval; and means for rendering said devices conductive in succession during a third predetermined time interval after said reverse switching means has been completely actuated to the reverse positions.

4. Apparatus for supplying power from a polyphase alternating current source to a load operating at a frequency substantially lower than that of said source comprising in combination, a plurality of pairs of conductors, each pair adapted to derive from said source a single phase potential displaced in phase with reference to the potential of the other pairs in accordance with the phase number of said source; an electric discharge device connected to at least one of each said pairs of conductors; reverse switching means having forward and reverse positions; means adapted to connect each said discharge device in series with said reverse switching means, said load and the other conductor of said pair to which said last-named device is connected; means for rendering said devices conductive in a predetermined succession for a predetermined first time interval with said reverse switching means in said forward position, said rendering means including means operative to permit said devices to become non-conductive at the end of said interval, while said switching means is still in said forward position; means for maintaining said devices non-conductive during a second predetermined time interval; means for actuating said switching means to said reverse position during said second interval; and means for rendering said devices conductive in a predetermined succession during a third predetermined time interval with said switching means in said reverse position.

5. Apparatus for supplying power from a polyphase alternating current source to a load operating at a frequency substantially lower than that of said source comprising in combination, a plurality of pairs of conductors, each pair adapted to derive from said source a single phase potential displaced in phase with reference to the potential of the other pairs in accordance with the phase number of said source; an electric discharge device connected to at least one of each said pairs of conductors; reverse switching means having forward and reverse positions for each of said devices; means adapted to connect each said discharge device in series with its respective one of said reverse switching means, said load and the other conductor of said pair to which said last-named device is connected; means for rendering said devices conductive in a predetermined succession for a predetermined first time interval with said reverse switching means in said forward position, said rendering means including means operative to permit said devices to become non-conductive at the end of said interval, while said switching means are still in said forward position; means for maintaining said devices non-conductive during a second predetermined time interval; means for actuating said switching means to said reverse position during said second interval; and means for rendering said devices conductive in a predetermined succession during a third predetermined time interval with said switching means in said reverse position.

6. In combination, terminals for connection to a power supply, terminals for connection to a load, an electric discharge device, conductors connecting said power supply terminals through said discharge device across said load terminals, a mechanical reversing switch means having forward and reverse positions interposed between said supply terminals and said load terminals, means for rendering said discharge device conductive for a first predetermined time interval and then permitting it to become non-conductive while said switch means is in said forward position, means for thereafter maintaining said discharge device non-conductive during a second interval, means, responsive to the conduction of said device during said first time interval, for actuating said reversing switch means to said reverse position, means for preventing said responsive means from actuating said switch means until said second interval and thereafter permitting said switch means to be actuated as aforesaid, and means for rendering said device conductive for a third time interval after said switch means has been actuated to said reverse position and while it is in said reverse position.

7. In combination, sets of terminals for connection to each phase of a polyphase source, terminals for connection to a load, at least one electric discharge device associated with each phase of said source, reversing switch means having a forward position and a reverse position, means for connecting each said discharge device in circuit with the set of terminals of its associated phase of said source, said switch means and said load terminals, means for rendering said discharge devices conductive in succession during a first predetermined time interval with said switch means in said forward position and thereafter permitting said devices to become non-conductive, means for maintaining said devices non-conductive during a second predetermined time interval after they have been permitted to be non-conductive, means, responsive to said devices while they are conductive as aforesaid, for conditioning said switch means to operate from said forward to said reverse position, means for actuating said switch means, while so conditioned, to said reversing position during said second interval, and means for rendering said devices conductive during a third predetermined time interval while said switch means is in said reverse position.

8. In combination, sets of terminals for connection to each phase of a polyphase source, a set of load terminals for connection to a load corresponding to each of said sets of source terminals, at least one electric discharge device associated with each phase of said source, a reversing switch means having a forward position and a reverse position associated with each phase of said source, means for connecting each said discharge device in circuit with the set of terminals of its associated phase of said source, the associated one of said switch means and the associated set of said load terminals, means for rendering said discharge devices conductive in succession during a first predetermined time interval with each of said switch means in said forward position and thereafter permitting said devices to become non-conductive, means for maintaining said devices non-conductive during a second predetermined time interval after they have been permitted to be non-conductive as aforesaid, means, responsive to said devices while they are conductive as aforesaid, for conditioning each of said switch means to operate from said forward to said reverse position, means for actuating said switch means, while so conditioned, to said reverse position during said second interval, and means for rendering said devices conductive during a third predetermined time interval while each of said switch means is in said reverse position.

9. In combination, pairs of terminals for connection to a polyphase power supply source; a pair of load terminals corresponding to each of said pairs of source terminals; an electric discharge device having an anode, a cathode and a control electrode corresponding to each of said pairs of source terminals; reverse switches means, having forward and reverse positions and being actuable from each of said positions to the other, corresponding to each of said pairs of source terminals; means for connecting in series between each of said pairs of source terminals, the anode and cathode of said associated device, said reverse switching means and the associated pair of load terminals so that in said forward position of said switching means current of one polarity is permitted to flow through each of said pair of load terminals and in the reverse position of said switching means current of the opposite polarity is permitted to flow between each of said pairs of load terminals; means connected to said control electrodes for rendering said discharge devices conducting in succession during a first predetermined time interval and thereafter permitting said devices to become non-conducting during a second time interval, said switching means being in said forward position during said first interval; means connected to said switching means for actuating said switching means from said forward position to said reverse position during said second interval; means connected to said switching means for preventing said actuating means from operating during said first interval; said means connected to said control electrodes rendering said discharge devices conducting in succession during a third interval after said switching means have been actuated to said reverse position.

References Cited in the file of this patent

UNITED STATES PATENTS

| Number | Name | Date |
|---|---|---|
| 755,669 | Hutchison | Mar. 29, 1904 |
| 2,173,828 | Doran | Sept. 26, 1939 |
| 2,415,708 | Sciaky | Feb. 11, 1947 |
| 2,431,083 | Sciaky | Nov. 18, 1947 |
| 2,431,262 | Longini | Nov. 18, 1947 |
| 2,478,373 | Dahline | Aug. 9, 1949 |
| 2,644,130 | Summers | June 30, 1953 |